(12) United States Patent
Fess et al.

(10) Patent No.: US 9,610,734 B2
(45) Date of Patent: Apr. 4, 2017

(54) INDEXING CART FOR THREE-DIMENSIONAL OBJECT PRINTING

(71) Applicant: Xerox Corporation, Norwalk, CT (US)

(72) Inventors: Donald R. Fess, Rochester, NY (US); Piotr Sokolowski, Webster, NY (US); Roger G. Leighton, Hilton, NY (US)

(73) Assignee: Xerox Corporation, Norwalk, CT (US)

( * ) Notice: Subject to any disclaimer, the term of this patent is extended or adjusted under 35 U.S.C. 154(b) by 45 days.

(21) Appl. No.: 14/793,159

(22) Filed: Jul. 7, 2015

(65) Prior Publication Data
US 2017/0008237 A1 Jan. 12, 2017

(51) Int. Cl.
*B29C 67/00* (2006.01)
*B65G 35/00* (2006.01)
*B29C 33/34* (2006.01)
*B33Y 30/00* (2015.01)

(52) U.S. Cl.
CPC .......... *B29C 67/0092* (2013.01); *B29C 33/34* (2013.01); *B29C 67/0055* (2013.01); *B65G 35/00* (2013.01); *B33Y 30/00* (2014.12)

(58) Field of Classification Search
CPC . B29C 67/00; B29C 67/0052; B29C 67/0082; B32B 2310/0843
USPC ...... 264/308, 113, 401; 425/193, 375, 174.4
See application file for complete search history.

(56) References Cited

U.S. PATENT DOCUMENTS

| 2,765,547 | A | 10/1956 | Dimmel et al. |
| 2,944,275 | A | 7/1960 | Markusen |
| 5,617,911 | A | 4/1997 | Sterett et al. |
| 5,904,100 | A | 5/1999 | Findley et al. |
| 6,191,507 | B1 | 2/2001 | Peltier et al. |
| 6,405,095 | B1 | 6/2002 | Jang et al. |
| 6,688,021 | B2 | 2/2004 | Baig et al. |
| 7,070,250 | B2 | 7/2006 | Lester et al. |
| 7,374,712 | B2 | 5/2008 | Swanson et al. |
| 8,167,395 | B2 | 5/2012 | Fienup et al. |
| 8,288,004 | B2 | 10/2012 | Moorlag et al. |
| 8,692,011 | B2 | 4/2014 | Moorlag et al. |
| 8,851,664 | B2 | 10/2014 | Spence |
| 8,888,480 | B2 * | 11/2014 | Yoo ..................... B29C 67/0081 264/113 |
| 9,517,591 | B2 * | 12/2016 | Yoo ..................... B29C 67/0096 |
| 2005/0208168 | A1 * | 9/2005 | Hickerson ........... B29C 67/0085 425/174.4 |
| 2006/0280580 | A1 | 12/2006 | Lutz |
| 2011/0125307 | A1 | 5/2011 | Dickson et al. |

(Continued)

FOREIGN PATENT DOCUMENTS

EP 2 474 418 B1 7/2012

*Primary Examiner* — Nahida Sultana
(74) *Attorney, Agent, or Firm* — Maginot Moore & Beck LLP (57) ABSTRACT

A mobile cart for a three-dimensional object printing system includes a mechanism that enables vertical movement of the platen with reference to ejector heads in the system. The mobile cart includes a pair of links at each end of a cart that pivotally connect a member positioned between the cart and the platen to the cart and the platen. An actuator is configured to laterally move the member bi-directionally and along an axis that is orthogonal to the member. This movement of the member pivots the links to raise and lower the platen depending on the direction in which the member is urged by the actuator.

19 Claims, 8 Drawing Sheets

(56) References Cited

U.S. PATENT DOCUMENTS

| | | |
|---|---|---|
| 2012/0105903 A1* | 5/2012 | Pettis .................. G06F 3/12 358/1.14 |
| 2012/0157277 A1 | 6/2012 | Moorlag et al. |
| 2013/0108726 A1* | 5/2013 | Uckelmann ......... B29C 67/0007 425/174.4 |
| 2013/0293652 A1 | 11/2013 | Spence et al. |
| 2013/0293653 A1 | 11/2013 | Spence et al. |
| 2014/0125749 A1 | 5/2014 | Spence |

\* cited by examiner

INDEXING CART FOR THREE-DIMENSIONAL OBJECT PRINTING

TECHNICAL FIELD

This disclosure relates generally to three-dimensional object printers, and, in particular, to mobile media carts for three-dimensional object printers.

BACKGROUND

Digital three-dimensional object manufacturing, also known as digital additive object manufacturing, is a process of making a three-dimensional solid object of virtually any shape from a digital model. Three-dimensional object printing is an additive process in which one or more ejector heads eject successive layers of material having different shapes on a substrate. Typically, ejector heads, which are similar to printheads in document printers, include an array of ejectors. Ejectors within a single ejector head can be coupled to different sources of material or an ejector head can be coupled to a single source of material to enable all of the ejectors in the ejector head to eject drops of the same material. Materials that become part of the object being produced are called build materials, while materials that are used to provide structural support for object formation, but are later removed from the object are known as support materials. Three-dimensional object printing is distinguishable from traditional object-forming techniques, which mostly rely on the removal of material from a work piece by a subtractive process, such as cutting or drilling.

Figure 9:
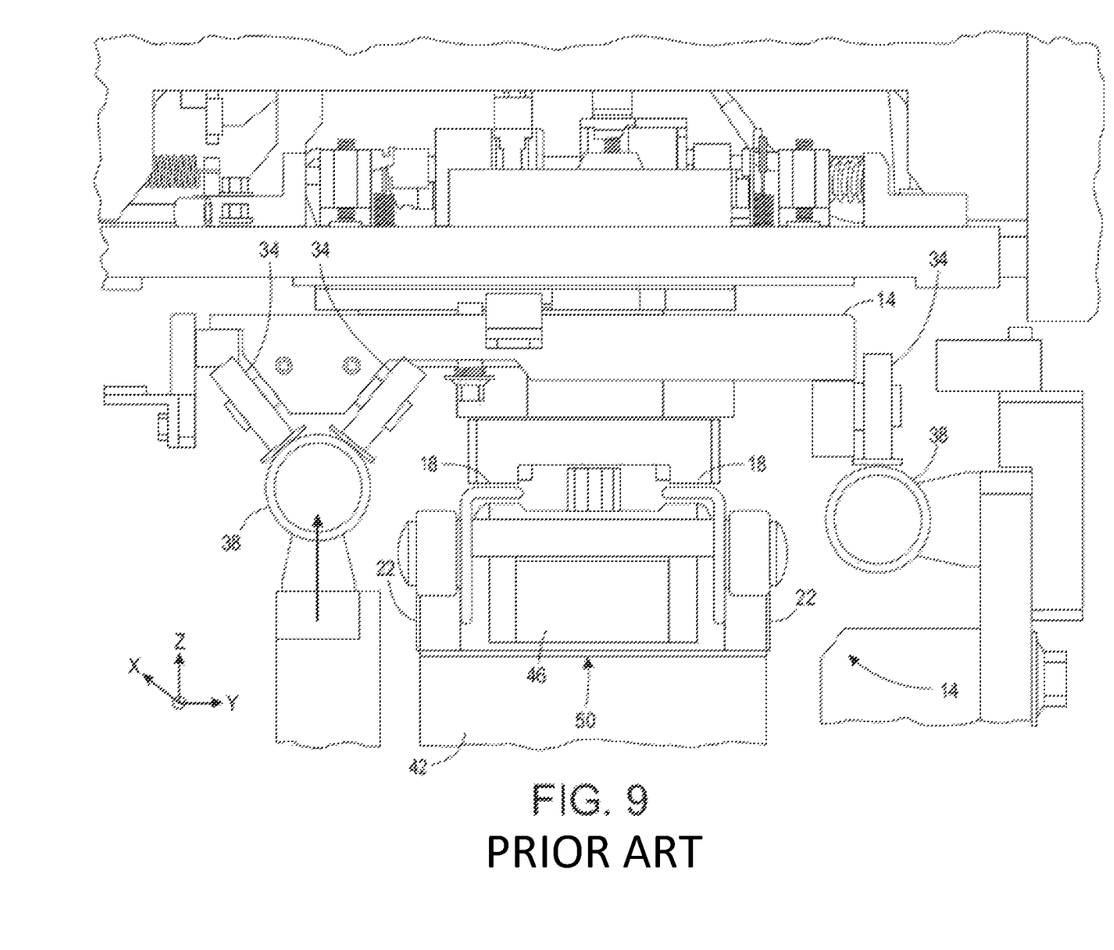
FIG. 9 is an end view of a known mobile cart that moves through a three-dimensional object printing system.
Figure 10:
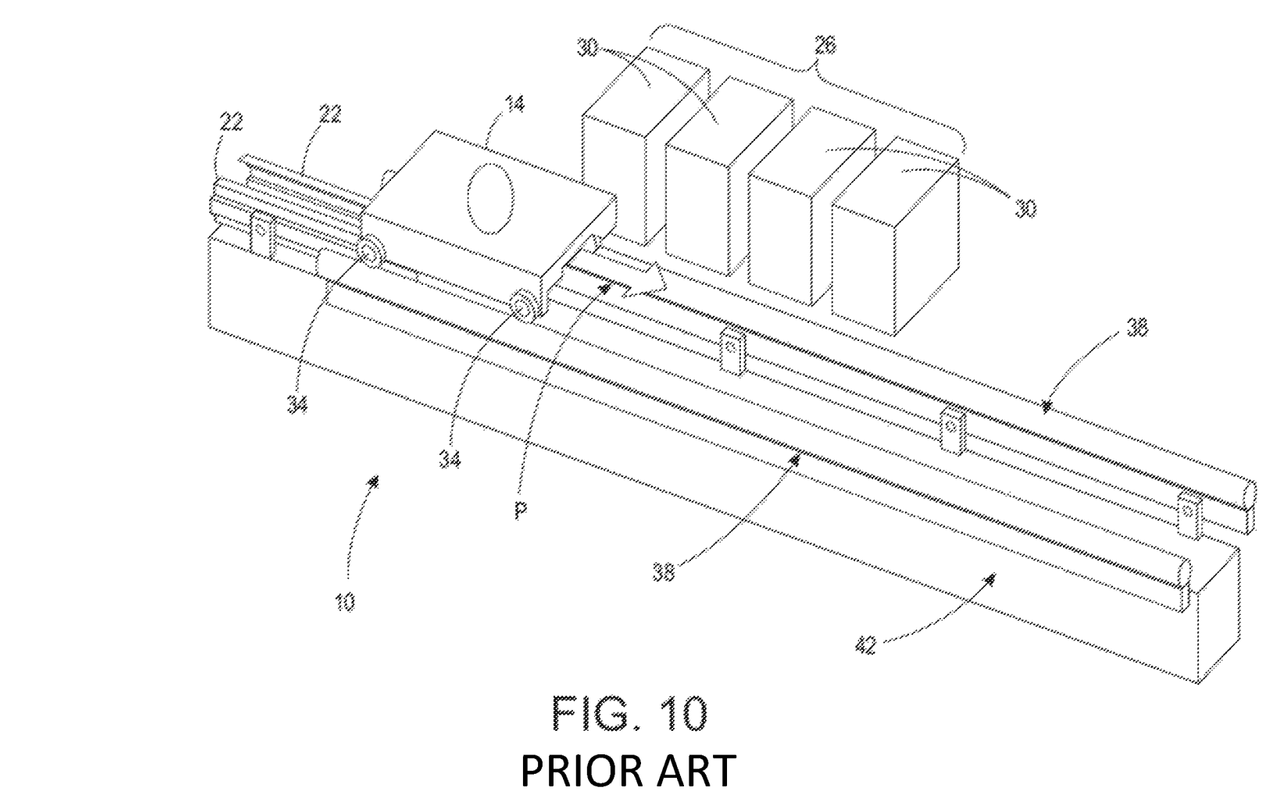
FIG. 10 is a perspective view of a known three-dimensional object printing system that has a mobile cart.

A previously known three-dimensional object printing system 10 is shown in FIG. 10. In the view depicted in that figure, a platform 14, called a cart, includes surfaces 18 (FIG. 9) that slide upon the upper surfaces of track rails 22 to enable the cart to move in a process direction P between printing stations, such as the printing station 26 shown in FIG. 10. Alternatively, carts can include wheels configured to roll along tracks, or other types of acceptable mobility mechanisms. Printing station 26 includes four ejector heads 30 as shown in the figure, although fewer or more ejector heads can be used in a printing station. Once the cart 14 reaches the printing station 26, the cart 14 transitions to and moves along precision rails 38 through the printing station. Precision rails 38 are cylindrical rail sections that are manufactured within tight tolerances to help ensure accurate placement and maneuvering of the cart 14 beneath the ejector heads 30. Linear electrical motors are provided within housing 42 of the track to interact with a magnet inside housing 46, which is connected to the lower surface of the cart 14. The motors generate electromagnetic fields that interact with the magnet to propel the cart along the track rails 22 between print stations and along the precision rails 38 within the printing stations. Once the cart 14 is beneath the printing station 26, ejection of material occurs in synchronization with the motion of the cart. Electrical motors (not shown) are operatively connected to a gantry to which the ejector heads are mounted to move the ejector heads in an X-Y plane that is parallel to an upper surface of the cart 14 as layers of material are formed in the object. Once the printing to be performed by a printing station is finished, the cart 14 is moved to another printing station for further part formation, layer curing, or other processing.

An end view of the system 10 is shown in FIG. 9. That view depicts in more detail the surfaces 18 that rest upon the rails 22 that extend from and above the electrical motor housing 42 of the track. As the motors generate electromagnetic fields that interact with the magnet in housing 46, the surfaces 18 of the cart 14 slide along the track rails 22. At the printing station, the bearings 34 of the cart 14 contact the precision rails 38 in an arrangement that facilitates accurate positioning of the build platen on the cart 14. Specifically, a pair of bearings 34 on one side of the cart 14 are positioned at a right angle to one another on one of the rails 38 to remove four degrees of freedom of the cart 14, while the bearing 34 on the other side of the cart 14 rests on the other rail 38 to remove one more degree of freedom. Gravity and magnetic attraction between the electrical motor and the magnet in the housing 46 hold the bearings 34 in contact with the rails 38.

Additional motors (not shown) move the printing station 26 vertically with respect to the cart 14 as layers of material accumulate to form an object. As material for forming the object accumulates, the topmost surface of the object grows closer to the ejector heads 30. Accurate ejection of material generally requires accurate control of a distance between the ejector head 30 and the surface receiving ejected material. Further, higher surfaces of an object being formed may impact the ejector heads 30 or another printing station 26 unless the distance between such stations and the top of the object is accurately controlled.

Generally, such additional motors for vertically moving the ejector heads 30 are configured to index a vertical location of the ejector heads to raise and lower the ejector heads to a height corresponding to a surface onto which material is to be ejected. However, even the diminutive motion needed to raise an ejector head 30 to account for an accumulated layer of material on a surface can affect the location of the ejector head 30 with regard to the object being formed, and negatively impact the accuracy of the printed object. Further, printing stations 26 configured with movable gantries that enable vertical indexing of the ejector heads 30 are complex, and require significant upkeep and testing to ensure accurate printing. Additionally, indexing the ejector heads 30 upwards requires all print jobs in the printing system 10 to simultaneously be on a same level of thickness, since indexing the ejector heads 30 for one cart 14 would require that the ejector heads 30 be subsequently relocated vertically for each additional cart. Therefore, a system for vertically indexing mobile carts that move through a printing system to enable accurate printing of three-dimensional objects with ejectors that are stationary in the Z-axis would be beneficial.

SUMMARY

Mobile carts that include the indexing mechanism are used in a three-dimensional object printing system that has multiple printing stations. The printing system includes at least one mobile cart, a track configured to support mobile carts thereon, an ejector head positioned opposite the track, an indexing station positioned along the track, and a controller. The mobile cart is operable to move along the track, and includes a first platform, a second platform, a member, and an actuator. The first platform is configured to move along the track, and the second platform has a planar upper surface parallel to the track. The member is positioned between the first platform and the second platform, and is configured such that movement of the member relative to the first platform moves the second platform along an axis that is normal to the planar upper surface. The actuator is positioned on the first platform, and is operable to laterally move the member bi-directionally to move the second platform along the axis normal to the planar upper surface.

The indexing station is operable to engage the actuator as the mobile cart passes by the indexing station along the track. The controller is configured to move the mobile cart along the track, operate the ejector head to eject a layer of material onto the planar upper surface of the second platform when the mobile cart is positioned opposite the ejector head, and operate the indexing station to engage the actuator as the mobile cart passes by the indexing station along the track to move the second platform of the mobile cart along the axis normal to the planar upper surface.

To enable more accurate movement of a platform on a mobile cart according to this disclosure, a mobile cart has been configured with an indexing mechanism that lifts and lowers the platform with a pair of links. The mobile cart includes a first platform, a second platform, a member, a plurality of first pivoting members, a plurality of second pivoting members, and an actuator. The first platform is configured to move along a track of a three-dimensional object printing system, and the second platform has a planar upper surface parallel to the track. The member is positioned between the first and second platforms. One end of each pivoting member in the plurality of first pivoting members is connected to the first platform, and another end of each pivoting member in the first plurality of pivoting members is connected to the member. The plurality of first pivoting members is configured to pivot and transform lateral motion of the member into motion of the member along an axis that is normal to the planar upper surface. One end of each pivoting member in the plurality of second pivoting members is connected to the member, and another end of each pivoting member in the second plurality of pivoting members is connected to the second platform. The plurality of second pivoting members is configured to pivot and transform lateral motion of the member and motion of the member along the axis normal to the planar upper surface into motion of the second platform along the axis normal to the planar upper surface. The actuator is positioned on the first platform, and is operable to laterally move the member bi-directionally to move the second platform along the axis normal to the planar upper surface.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

FIGS. 1-4 illustrate different views of an exemplary embodiment of a mobile cart 100 that moves through a three-dimensional object printing system according to this disclosure. The cart 100 includes a first platform 102, a second platform 104, a member 106, a plurality of first pivoting members 108, a plurality of second pivoting members 110, an actuator 112, and a belt guide member 185.

The first platform 102 is configured to move along a track of the printing system. While not illustrated in FIG. 1 for the purpose of clarity, the track can be similar, for example, to the tracks 22 and the precision rails 38 discussed above with regard to FIG. 10. In this embodiment, a plurality of bearings 114 and magnet housings 115 are operatively connected to the first platform 102 and enable the first platform 102 to move along the track, but in other embodiments, other mechanism that enable the first platform 102 to move along the track, such as sliding surfaces, air bearings, drive mechanisms, and the like, are also contemplated.

Figure 1:
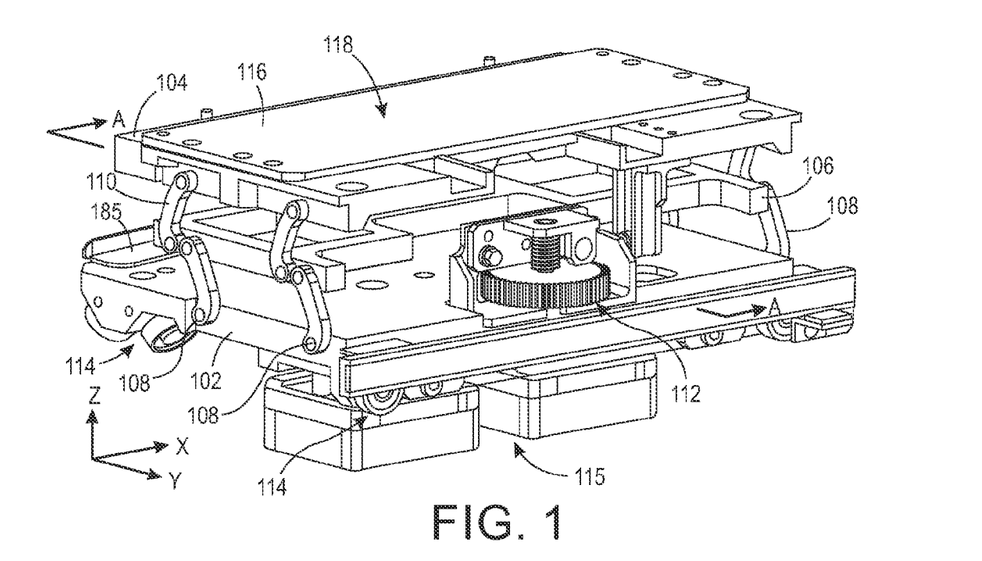
FIGS. 1 and 2 are perspective views of an exemplary embodiment of a mobile cart that moves through a three-dimensional object printing system according to this disclosure.

In this embodiment, the first platform 102 is configured to be between the track and the second platform 104 when the cart is positioned on the track. A substantially planar upper surface 116 of the second platform 104 is configured to receive material ejected by an ejector head of the printing system for forming three-dimensional objects. In this embodiment, the second platform 104 includes a removable plate 118 that defines the upper surface 116, but in other embodiments, the second platform 104 does not include a removable plate.

Ejector heads for forming three-dimensional objects generally require that a surface receiving material, such as the planar surface 116, be precisely located relative to the ejector head. As discussed above, three-dimensional objects are generally formed by building up successive layers of material. In other words, portions of a three-dimensional object are formed by ejecting material onto portions of previously ejected material. However, the portions formed by previously ejected materials define a printing surface at a different location than the original surface configured to receive material.

Ejector heads generally have a narrow tolerance for changes in distance between the ejector head and a surface on which an object is to be formed. As successive layers of material build up, this tolerance can be maintained by indexing the ejector head and the original surface relative to each other. Generally, this indexing has been accomplished by configuring the ejector head to move in a direction normal to the original surface. In a known example, mounting the ejector head in a complex gantry, or using a complex system of actuators, enable the ejector head to move towards or away from a printing surface to accommodate the accumulation of material. However, whenever the ejector head moves, a relocating operation usually needs to be performed to relocate the ejector head relative to the three-dimensional object being formed so accurate printing can be maintained. The relocation process can significantly add to object printing time and system wear. Further, in a system such as the printing system 10 described with regard to FIG. 10, where multiple different mobile carts may be in use to form three-dimensional objects with different shapes at different stages, the ejector head needs to be re-indexed and relocated for each cart, each time a cart passes by the ejector head. Therefore, a system for indexing a printing surface relative to an ejector head that does not require moving the ejector head would be beneficial.

As shown in FIG. 1, the member 106 is configured so movement of the member 106 relative to the first platform 102 moves the second platform 104 in a direction that is normal to the planar upper surface 116. The actuator 112 is positioned on the first platform 102, and is operable to move the member 106 bilaterally with respect to the planar upper surface 116 of the second platform 104. The bilateral movement of the member 106 moves the second platform 104 bi-directionally along an axis normal to the planar upper surface 116. Thus, the cart 100 enables the planar upper surface 116 of the second platform 104 to index relative to an ejector head positioned opposite the track without moving the ejector head. In other words, each cart 100 in a printing system according to this disclosure can index a respective second platform 104 independently of both the ejector head and other second platforms of other carts 100.

Figure 2:
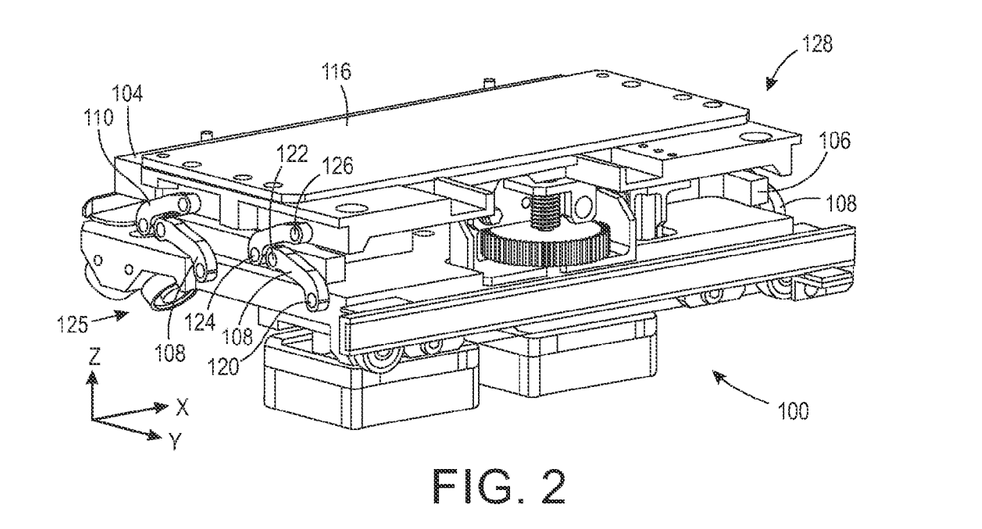

In this embodiment, the member 106 is positioned between the first platform 102 and the second platform 104. As illustrated in FIG. 2, one end 120 of each pivoting member 108 in the plurality of first pivoting members 108 is connected to the first platform 102, and another end 122 of each pivoting member 108 is connected to the member 106. The pivoting members 108 are configured to pivot and transform the lateral movement of the member 106 (in the Y axis) into movement of the member 106 in the direction normal to the planar upper surface 116 (in the Z axis). One end 124 of each of the second pivoting members 110 is connected to the member 106, and another end 126 of each pivoting member 110 is connected to the second platform 104. The pivoting members 110 are configured to pivot and cooperate with the movement of pivoting members 108 to transform the lateral motion of the member 106 and the motion of the member 106 in the direction normal to the planar upper surface 116 into movement of the second platform 104 in the direction normal to the planar upper surface 116

FIG. 1 illustrates the second platform 104 in a raised position, and FIG. 2 illustrates the second platform 104 in a lowered position. In FIG. 2, both the first pivot members 108 and the second pivot members 110 have been pivoted relative to their respective positions in FIG. 1. Operating the actuator 112 enables indexing the second platform 104 to different heights, such as the raised position in FIG. 1, the lowered position in FIG. 2, and positions in-between. A single instance of indexing, i.e., a single operation of the actuator 112, may correspond to a minute adjustment of the second platform 104. In one embodiment, the cart 100 is configured such that the second platform can be indexed in increments in a range from about 5 microns to about 100 microns, or more particularly, about 25 microns. The raised position in FIG. 1 and the lowered position in FIG. 2 thus represent the outer bounds for the positioning of the second platform 104 in one embodiment.

In FIG. 2, the member 106 has moved from the position depicted in FIG. 1 towards the first platform 102 in the normal (negative Z) direction and laterally in the lateral negative Y) direction, and the second platform 104 has moved solely in the normal (negative Z) direction towards the first platform 102. Since the second platform only moves in the Z axis, and does not move in the X and Y axis relative to the first platform 102, material can continue to be accurately ejected by the ejector head onto the surface 116 without relocating the surface 116 and ejector head relative to each other. Both the first pivot members 108 and the second pivot members 110 pivot about respective axes that are parallel with the X axis. However, the first pivot members 108 rotate in a direction that is opposite of a direction of rotation of the second pivot members 110.

In this embodiment, the first pivot members 108 are configured to rotate in a counter-clockwise direction when the member 106 moves in the negative Y direction, and thus the second pivoting members 110 are configured to pivot in a clockwise direction to lower the second platform 104. In another embodiment, the directions of rotation are reversed, such that motion of the member 116 in the negative Z direction causes the first pivoting members 108 to rotate in the clockwise direction, and the second pivoting members 110 rotate in the counter-clockwise direction to raise the second platform 104. In such an embodiment, lowering the second platform can be achieved via motion of the member 106 in the positive Y direction.

In this embodiment, an end 122 of each first pivoting member 108 is connected to the member 106 so as to be adjacent to an end 124 of a respective second pivoting member 110. This configuration defines a pivot joint between a respective first pivot member 108 and a corresponding second pivot member 110 that enables smooth motion and support of the member 106 and second platform 104. However, in other embodiments, other arrangements of the pivoting members 108 and 110 are also contemplated.

Additionally, in this embodiment, the plurality of first pivoting members 108 includes two pivoting members 108 on a first side 125 of the cart 100, and two pivoting members 108 on a second side 128 of the cart 100. The plurality of second pivoting members similarly includes two pivoting members 110 on the first side 125 of the cart 100, and two pivoting members 110 on the second side 128 of the cart 100. This configuration ensures support of the member 106 and second platform 104 without interfering with the actuator 112, which is positioned between the two sides 125 and 128. In other embodiments, other quantities of pivoting members 108 and 110 arranged at different locations on the cart 100 are also contemplated.

Figure 3:
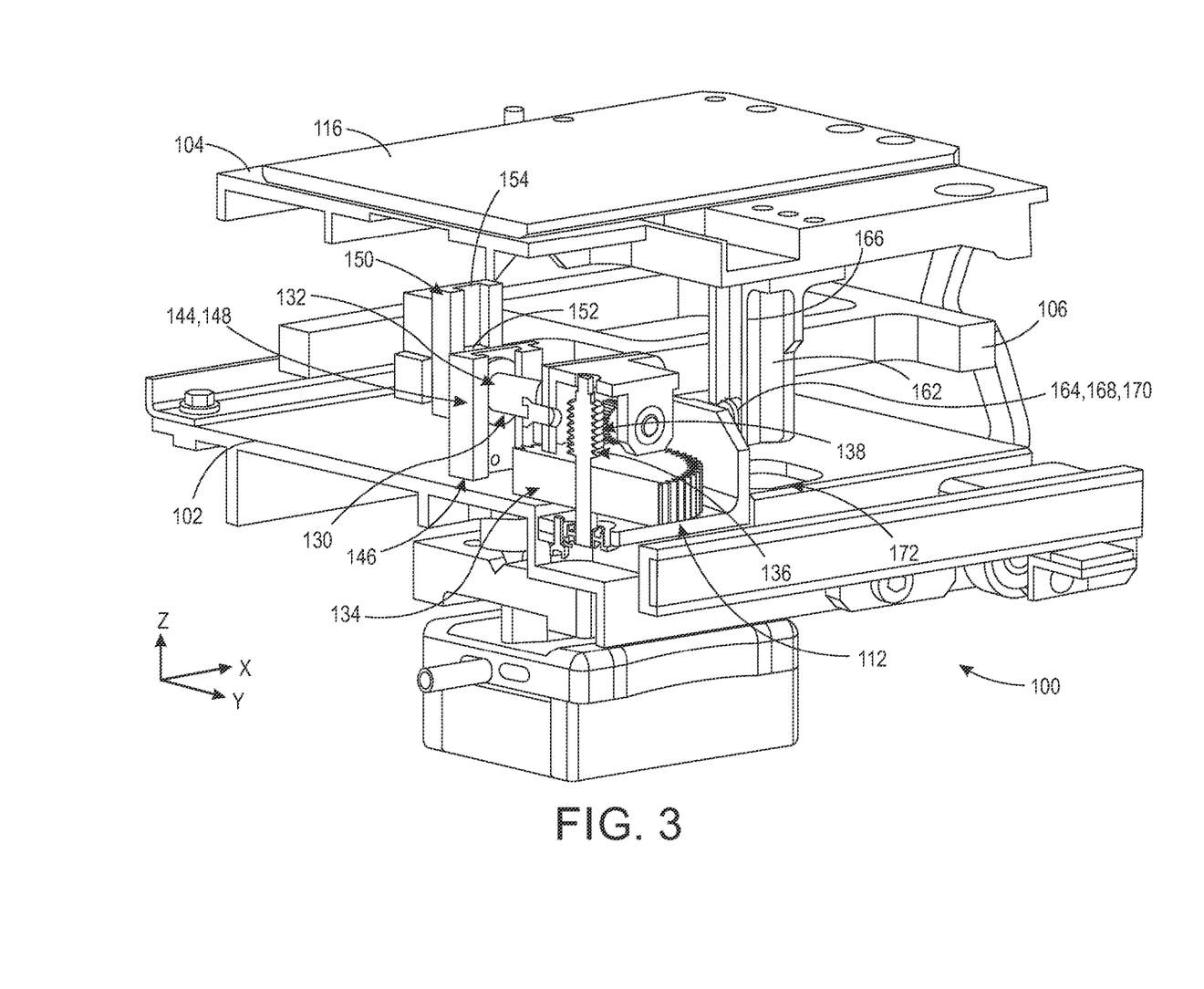
FIGS. 3 and 4 are perspective sectional views of the mobile cart of FIGS. 1 and 2 taken along the section line A-A in FIG. 1.

FIG. 3 illustrates a sectional view of the cart 100 in the raised position along the section line A-A in FIG. 1 in order to show several aspects in more detail. As illustrated in FIG. 3, the actuator 112 includes a rod 130, a bushing 132, a pulley member 134, and a worm gear 136. The worm gear 136 is configured and arranged to rotate with the pulley member 134 about an axis normal to the planar upper surface 116, such that driving the pulley member 134, when driven for example via an indexing station described in more detail below, causes the worm gear 136 to rotate. One end of the rod 130 includes a gearing 138 that engages the worm gear 136 so the rod 130 rotates in response to the rotation of the worm gear 136.

Figure 4:
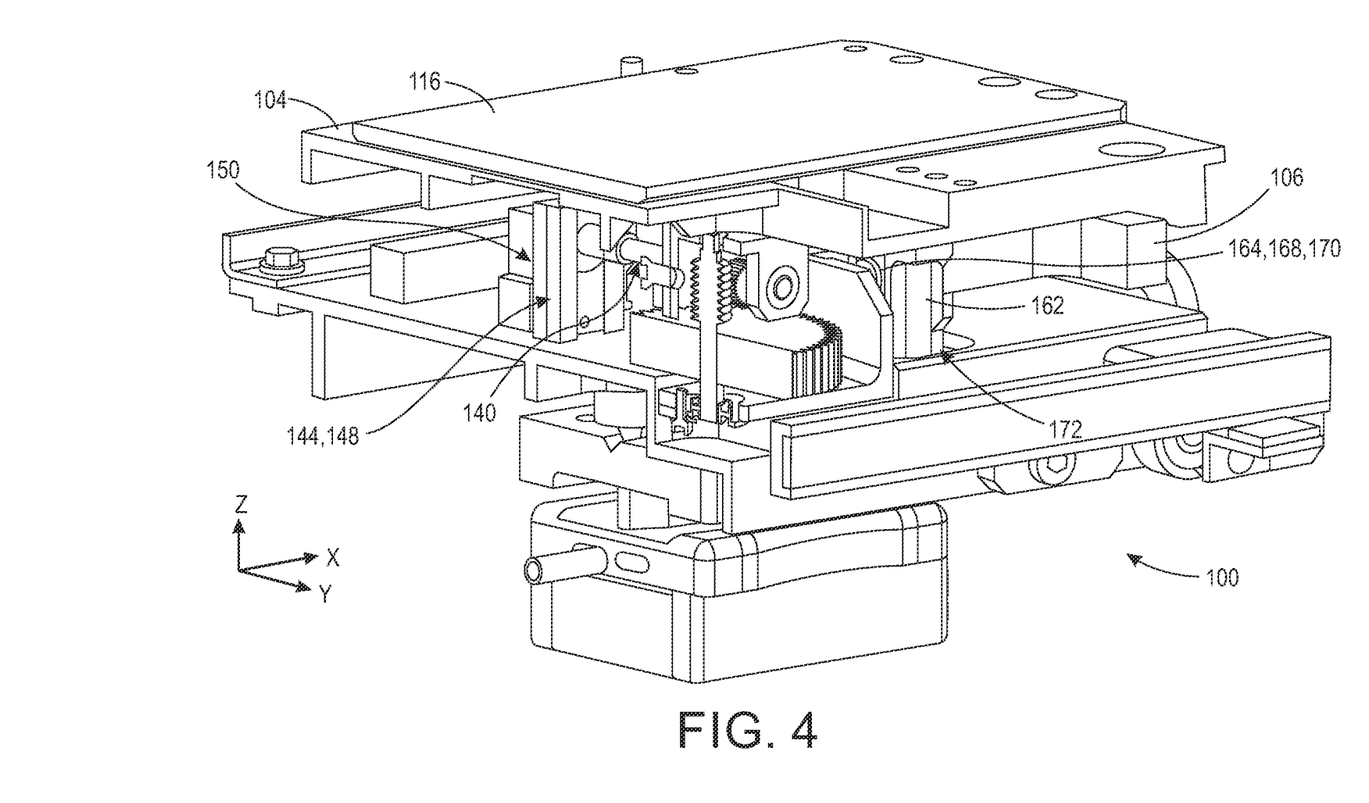

FIG. 4 illustrates a sectional view along the section line A-A where the cart 100 has been moved to the lowered position of FIG. 2. Another end of the rod 130 includes an external thread 140 that is received in an internal thread of the bushing 132 (not shown for the purpose of clarity). The bushing 132 is configured and arranged to be rotationally fixed relative to the rod 130. In this embodiment, the bushing 132 is connected to a support member 144 having a bottom face 146 that rests on the first platform 102 and prevents the bushing 132 from rotating. In other embodiments, other mechanisms for rotationally fixing the bushing 132 are also contemplated. This configuration enables rotation of the rod 130 within the internal thread to move the bushing 132 bi-directionally along the rod 130. The bushing 132 is configured so the bi-directional movement of the bushing 132 moves the member 106 bilaterally with reference to the planar upper surface 116 of the second platform 104.

While the pivoting members 108 transform motion of the member 106 in the lateral direction into motion of the member 106 in the normal direction, additional guidance of the member 106 to move in the normal direction may be beneficial. The cart 100 further includes a first pair of cooperating members 148 and 150 configured to cooperatively guide motion of the member 106 in a direction normal to the planar upper surface 116 as the member 106 moves laterally with reference to the planar upper surface 116 of the second platform 104. In other words, the first pair of cooperating members 148 and 150 assists the plurality of first pivoting members 108 in guiding the member 106 to move in the normal direction. The cooperating member 148 is fixed to the actuator 112, and the cooperating member 150 is fixed to the member 106.

In this embodiment, the support member 144 is configured to act as the cooperating member 148, and defines a normally oriented protrusion 152 configured to slide within a normally oriented recess 154 defined in the cooperating member 150. As illustrated in FIG. 4, in comparison with FIG. 3, as the bushing 132 is moved laterally due to rotation of the rod 130, the cooperating member 148, fixed to the bushing, is also moved laterally. The cooperating member 148 engages with the cooperating member 150 to move the member 106 laterally, and as the member 106 moves laterally, the pivoting members 108, the protrusion 152, and the recess 154 together guide the member 106 along in the normal direction.

While the second pivoting members 110 transform motion of the member 106 into motion of the second platform 104 in the normal direction, further guidance of the motion of the second platform 104 to be solely in the normal direction may be beneficial in order to ensure that the planar upper surface 116 is accurately located for forming a three-dimensional object thereon. The cart 100 further includes a second pair of cooperating members 162 and 164 configured to cooperatively restrain motion of the second platform 104 to be normal to the planar upper surface 116.

Cooperating member 162 extends from the second platform 104 towards the first platform 102 and defines a recess 166 aligned with a vertical or Z axis. Cooperating member 164 is fixed to the first platform 102, and defines a protrusion 168 configured to move along the recess 166. In this embodiment, the protrusion 168 includes a bearing 170 that is configured and arranged to be held captive within the recess 166. The protrusion 168 restrains the cooperating member 162 along with the second platform 104 from moving laterally. However, since the protrusion 168 can move along the recess 166 as the cooperating member 162 moves in the normal direction, motion of the second platform 104 in the normal direction is unrestrained by the cooperating members 162 and 164.

In this embodiment, the first platform 102 defines an aperture 172 configured to receive at least a portion of the cooperating member 162, so the first platform 102 does not interfere with the cooperating member 162 when the cooperating member 162 moves towards the first platform 102. This configuration enables the second platform 104 to be indexed by a greater height than if the normal motion of the cooperating member 162 were limited by the first platform 102.

As described above, motion of the member 106 in the Y direction corresponds to motion of the second platform in the Z direction. However, as the pivoting members 108 and 110 respectively rotate, the ratio between the motion of the member 106 in the Y direction and the resulting motion of the second platform 104 in the Z direction changes due to a changing sweep angle of the pivoting members 108 and 110. In other words, operating the actuator 112 to move the member 106 by a unit distance d in the Y direction results in moving the second platform 104 different distances in the Z direction for different starting positions of the pivoting members 108 and 110. Because accurate indexing of the second platform 104 enables accurate printing, accounting for this changing ratio can be beneficial.

In one embodiment, at least one of the internal thread of the bushing 132, the external thread 140 of the rod 130, the gearing 138 of the rod, the pulley member 134, and the worm gear 136 has a gearing/thread ratio that varies along its extent to compensate for the changing sweep of the pivoting members 108 and 110. In one example, a pitch angle of the worm gear 136 may change along its length so that the rod 130 rotates at different rates as the worm gear 136 continues to rotate. In another example, the pulley member 134 is non-circular or has a gearing that changes along its circumference. Other mechanisms for a varying gearing/thread ratio are also contemplated. In another example, mechanisms external to the cart 100 are configured to drive the pulley member 134, and to compensate for the changing ratio due to the changing sweep of the pivoting members 108 and 110.

Figure 5:
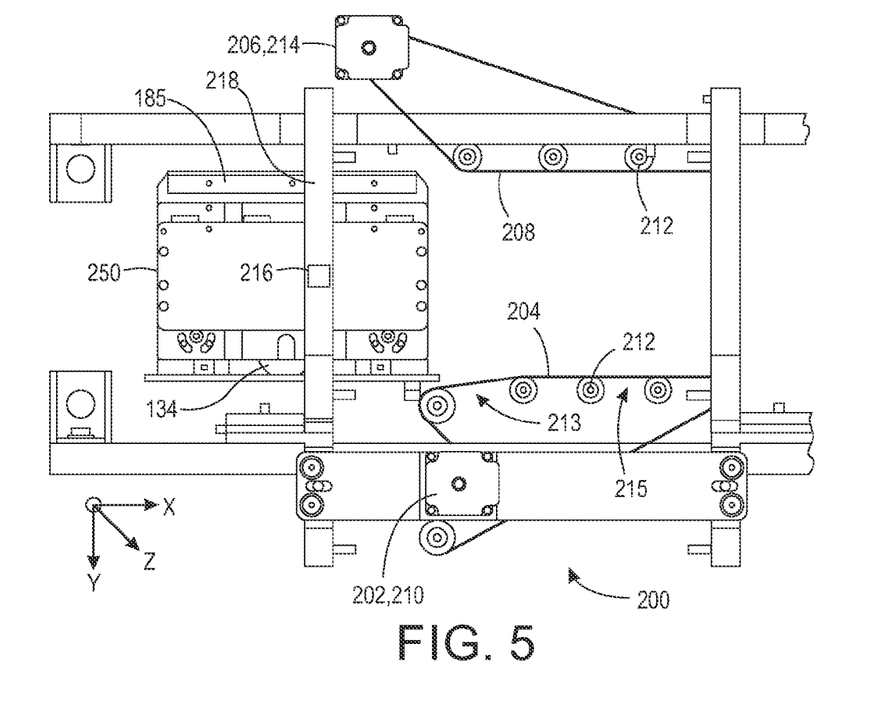
FIG. 5 is a top view of an exemplary embodiment of an indexing station for indexing a mobile cart in a three-dimensional object printing system according to this disclosure.
Figure 6:
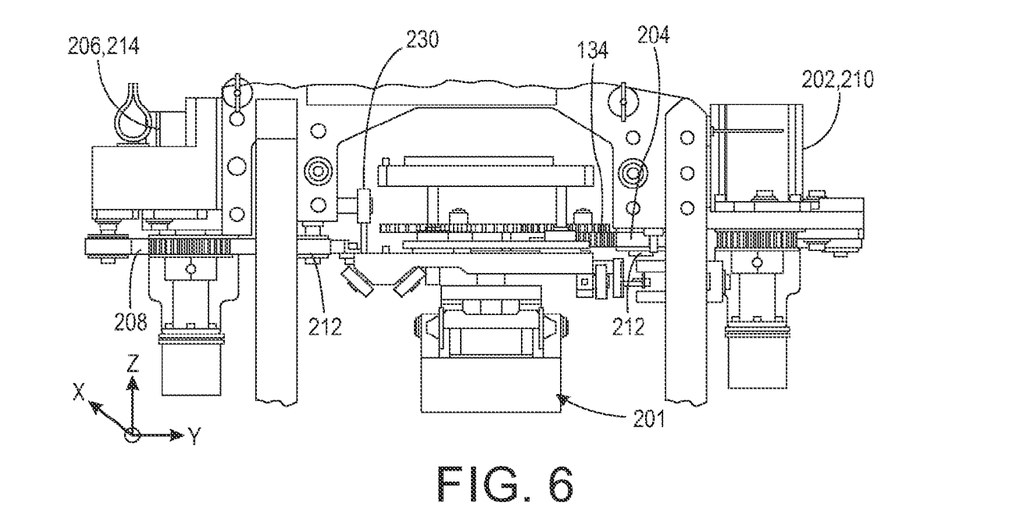
FIG. 6 is an end view of the indexing station of FIG. 5.
Figure 7:
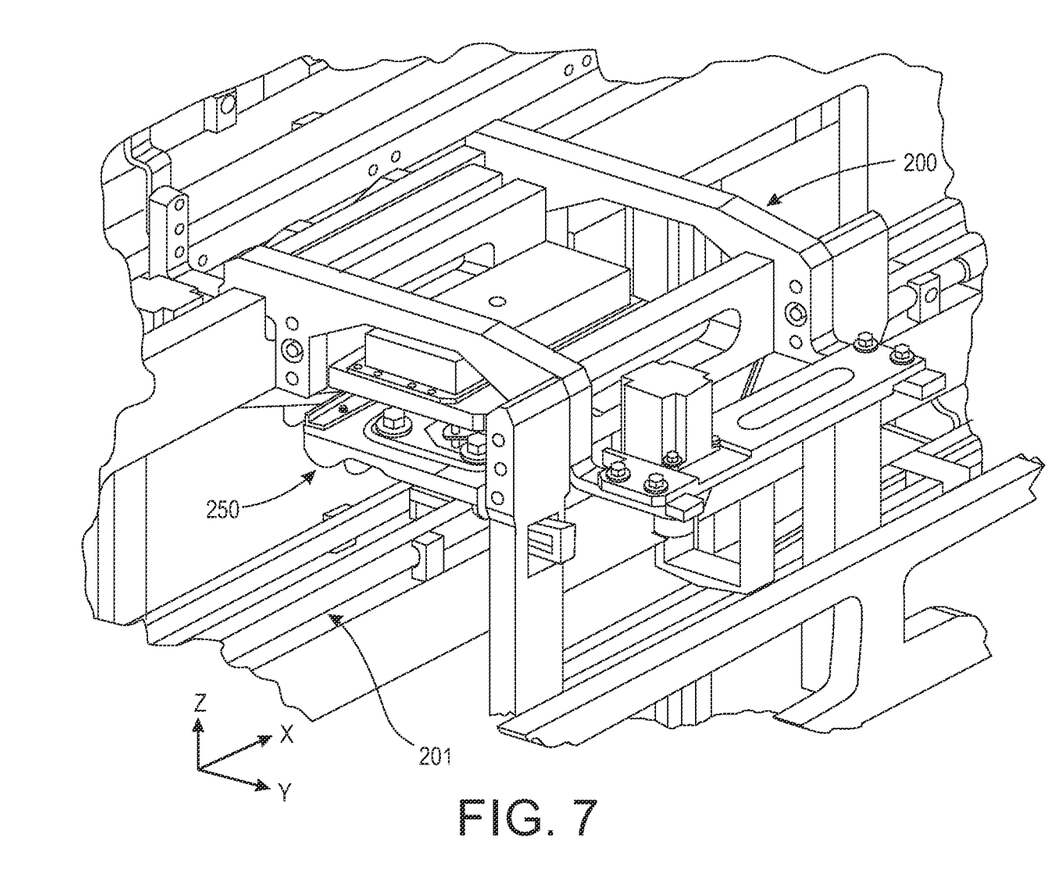
FIG. 7 is a perspective view of the indexing station of FIG. 5.

A top view, side view, and perspective view of an exemplary embodiment of an indexing station 200 are illustrated in FIGS. 5, 6, and 7, respectively. FIGS. 5-7 illustrate a mobile cart 250 positioned at the indexing station 200 that differs in some aspects to the mobile cart 100 described above, and the indexing station 200 is configured such that various types of mobile carts including the mobile carts 100 and 250 can be indexed via the indexing station. Like elements of the mobile cart 250 are described with the reference numbers of like elements of the mobile cart 100.

The indexing station 200 of FIG. 5 is positioned along the track 201 of the printing system, as seen in FIG. 7, and includes a first drive motor 202, and a first drive belt 204. In this embodiment, the indexing station 200 further includes a second drive motor 206, and a second drive belt 208. First and second controllers 210 and 214 are respectively integrated into the drive motors 202 and 206. Additionally, in this embodiment at least one sensor 216 (FIG. 5) is integrated into a cross brace 218 of the indexing station.

The first controller 210 is configured to operate the first drive motor 202 to drive the first drive belt 204 at different speeds to index the mobile cart 250. As the cart 250 passes by the indexing station 200 on the track 201, the pulley member 134 engages with the first drive belt 204. When the first drive belt 204 is being driven at a speed equal to a speed at which the mobile cart 250 is moving along the track 201, i.e. at a "nominal" rate, no relative motion occurs between the pulley member 134 and the first drive belt 204. As a result, the pulley member 134 does not rotate and the actuator of the mobile cart 250 does not actuate.

To index the mobile cart 250, the first controller 210 is configured to operate the first drive motor 202 to drive the first drive belt 204 at a speed that is different than the speed at which the mobile cart 250 is moving along the track 201. The pulley member of the mobile cart 250 is driven by the first drive belt 204 at a rate resulting from a relative difference in the speed of the first drive belt 204 and the speed of the mobile cart 250. By driving the first drive belt 204 faster than the speed of the mobile cart, the pulley member 134 is driven in a first direction, and by driving the first drive belt slower than a speed of the mobile cart 250, the pulley member 134 is driven in a second direction. Thus, the indexing station 200 can index the mobile cart 250 by selecting different drive speeds of the first drive belt 204 as the mobile cart 250 passes through the indexing station 200. The first and second drive belts 204 and 208 are continuous belts that are supported by various wheels 212, and can be formed from any acceptable material known in the art. In other embodiments, no drive belts are included, and the various wheels 212 are configured to engage the mobile cart 250.

In the embodiment of FIG. 5, the first drive belt 204 is configured to have a transition region 213 and a linear region 215. The transition region 213 is oblique with respect to the linear section 215, and is configured to gradually engage the pulley member 134 to reduce abrupt forces that may otherwise act on the mobile cart 250 when the first drive belt is moving at a different speed than the mobile cart 250. Other arrangements for the first drive belt 204 are also contemplated.

In other embodiments, the first controller 210 and second controller 214 are positioned separately from the first drive motor 202 and second drive motor 206, and in some embodiments the controllers 210 and 214 are integrated into a common indexing controller, or are integrated together with a central controller of the printing system that is positioned apart from the indexing station 200.

The controllers 210 can be configured to operate the first drive motor 202 with reference to various drive profiles. In an example, the controller 210 is configured to operate the first drive motor 202 with reference to a stepper profile that results in a constant predetermined relative difference between the speed of the first drive belt 204 and the mobile cart 250 as the mobile cart 250 passes by the indexing station 200 in order to index the mobile cart 250 by a predetermined amount. For example, a stepper profile can be applied to the first drive motor 202 in order to index the mobile cart 250 by 25 microns, or another predetermined height corresponding to a height of the layers of material applied by the ejector head of the printing system.

Other profiles for varying the rate of the drive belt 204 from the nominal rate, such as linear, smooth, and the like are also contemplated. In one embodiment, the controller 210 is configured to determine a desired indexing change for the mobile cart 250, and determine a profile to be applied to the drive motor 202 based on the desired change in height. In another embodiment, the controller 210 is configured to compensate for a varying rate of indexing of a mobile cart, such as due to the varying sweep of the pivoting members 108 and 110 of the mobile cart 100, by applying different indexing profiles to the drive motor 202 for different positions of the pivoting members 108 and 110 and different heights of the second platform 104.

The at least one sensor 216 is configured to generate a signal indicative of at least one of a current height of the mobile cart 250, a current height of an object formed on the mobile cart 250, a measured position of the pivoting members 108 and 110, a thickness of the layer(s) of material to be ejected by the ejector head, a measured thickness of an immediate previous layer of material ejected by the ejector head onto the platform 104, a model corresponding to a shape of the three-dimensional object to be formed on the second platform, a rate of motion of the cart 100, and other aspects of the mobile cart 250 and the printing system. The controller 210 can be configured to generate or select a profile for driving the drive motor 202 with reference to the signal generated by the at least one sensor 216. The at least one sensor 216 can include, for example, a laser positioning sensor, an optical sensor, an infra-red sensor, a transducer, or other types of sensors.

In one embodiment, rather than being positioned on or near the indexing station 200, the sensor 216 is included on the cart. In another embodiment, a further sensor is positioned after the ejector head along the track 201, and is configured to sense a height of material forming the three-dimensional object after the material is ejected by the ejector head. Further sensors can also positioned after a curing station or another printing station, or after the indexing station 200 along the track 201 to enable verifying that the indexing of the second platform of the cart 100 was accurately performed.

Because the pulley member 134 is driven due to the relative difference in the speed of the first drive belt 204 and the mobile cart 250, ensuring that the mobile cart 250 maintains a constant velocity regardless of any influence of the first drive belt 204 is beneficial for accurately indexing the mobile cart 250. The second controller 214 is configured to operate the second drive motor 206 to drive the second drive belt 208 at a rate equal to the nominal speed of the mobile cart 250. Further, the mobile cart 250 of FIG. 5 includes a belt guide member 185 similar to a belt guide member 185 of the mobile cart 100 (FIG. 1). The second drive belt 208 is configured to engage the belt guide member 185 as the mobile cart 250 passes through the indexing station 200 to ensure that the mobile cart 250 maintains a constant velocity at the nominal speed while passing through the indexing station. In this embodiment, the second drive belt 208 is arranged to be linear in a region at which it engages the mobile cart 250, but other arrangements are also contemplated.

As illustrated in the end view of FIG. 6, when the mobile cart 250 is passing through the indexing station 200, the mobile cart is held between the second drive belt 208 and the first drive belt 204. The close engagement between the drive belts 204 and 208, and the mobile cart 250 ensures that the relative difference in speed between the first drive belt 204 and second drive belt 208 drives the pulley member 134 without, for example, causing the mobile cart 250 to flex, turn, accelerate, or decelerate while moving along the track 201. As illustrated in FIG. 6, in this embodiment, the indexing station 200 further includes a further wheel 230 that vertically engages the belt guide member 185 in the negative Z direction to ensure that the mobile cart 205 is held against the tract 201 while being indexed.

Figure 8:
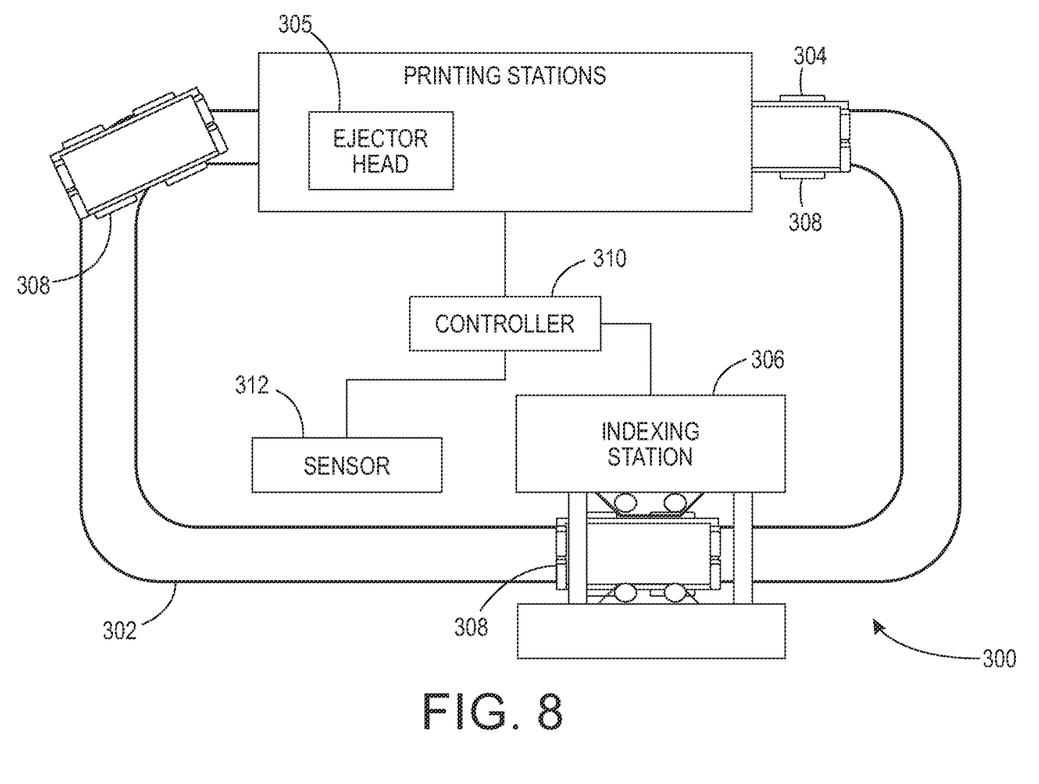
FIG. 8 is a schematic of a three-dimensional object printing system having an indexing station and a mobile cart according to this disclosure.

FIG. 8 is a schematic diagram of a printing system 300 according to this disclosure. The system 300 includes a track 302, a plurality of printing stations 304 that include at least an ejector head 305, an indexing station 306, a plurality of mobile carts 308, and a controller 310. The mobile carts 308 are configured to move along the track 302 past the plurality of printing stations 304, which are disposed opposite the track 302 and are operable to perform various printing operations on the mobile carts 308. The indexing station 306 is positioned alongside the track 302, and is operable to index the mobile carts 308 as they pass. The controller 310 is in communication with and is configured to move the mobile carts 308 along the track 302, and is in communication with and is configured to operate the printing stations 304 and the indexing station 306. In this embodiment, the printing system 300 further includes at least one sensor 312 that is configured to sense a condition of the mobile carts 308, and that is in communication with at least one of the controller 310 and the indexing station 306.

In one embodiment, at least one of the controller 310 and the indexing station 306 is configured to store respective information about each mobile cart 308 to enable the indexing station 306 to independently index each mobile cart 308. In another embodiment, the indexing station 306 is configured to index each mobile cart 308 as it passes by in a dynamic fashion, where an amount of indexing for a particular mobile cart is determined, for example, by the sensor 312 as the mobile cart approaches the indexing station 306.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A cart that moves through a three-dimensional object printing system comprising:
    a first platform configured to move along a track of the printing system;
    a second platform that has a planar upper surface parallel to the track;
    a member positioned between the first platform and the second platform;
    a plurality of first pivoting members, one end of each pivoting member in the plurality of first pivoting members being connected to the first platform and another end of each pivoting member in the plurality of first pivoting members being connected to the member, the plurality of first pivoting members being configured to pivot and transform lateral motion of the member into motion of the member along an axis that is normal to the planar upper surface;
    a plurality of second pivoting members, one end of each pivoting member in the plurality of second pivoting members being connected to the member and another end of each of the plurality of second pivoting members being connected to the second platform, the plurality of second pivoting members being configured to pivot and transform lateral motion of the member and motion of the member along the axis normal to the parallel upper surface into motion of the second platform along the axis normal to the planar upper surface; and
    an actuator positioned on the first platform and operable to laterally move the member bi-directionally to move the second platform along an axis normal to the planar upper surface.

2. The cart according to claim 1, the actuator further comprising:
    a rod having an external thread; and
    a bushing having an internal thread configured to receive the external thread of the rod, the bushing being rotationally fixed relative to the rod to enable rotation of the rod within the internal thread to move the bushing bi-directionally along the rod, wherein the bi-directional movement of the bushing laterally moves the member bi-directionally;
    the actuator being configured to rotate the rod to move the second platform along the axis normal to the planar upper surface.

3. The cart according to claim 2, the actuator further comprising:
    a pulley member configured to be driven by an indexing station positioned opposite the track of the printing system; and
    a worm gear configured to engage the pulley member and rotate the rod as the worm gear rotates.

4. The cart according to claim 1, the actuator further comprising:
    a first pair of cooperating members configured to guide motion of the member along the axis normal to the planar upper surface as the member moves laterally, one of the first pair of cooperating members being fixed to the actuator and the other of the first pair of cooperating members being fixed to the member.

5. The cart according to claim 1 further comprising:
    a second pair of cooperating members configured to restrain motion of the second platform along the axis normal to the planar upper surface, one of the second pair of cooperating members extending from the second platform towards the first platform and defines a recess, and the other of the second pair of cooperating members being fixed to the first platform and defining a protrusion that is received within and is configured to move along the recess.

6. The cart according to claim 5, the first platform defining an aperture configured to receive at least a portion of the one cooperating member extending from the second platform so motion of the second platform towards the first platform is not restrained by the one cooperating member.

7. The cart according to claim 1 further comprising:
    a plate that is removably mounted on the planar upper surface of the second platform, the plate being configured to receive material ejected from an ejector head of the printing system for forming a three-dimensional object.

8. The cart according to claim 1 wherein the end of each pivoting member in the plurality of second pivoting members connected to the member is arranged to be adjacent to the other end of a respective pivoting member in the plurality of first pivoting members connected to the member.

9. A three-dimensional object printing system comprising:
    a track;
    an ejector head positioned opposite the track;
    a cart that is operable to move along the track, the cart comprising:
        a first platform configured to move along the track;
        a second platform having a planar upper surface parallel to the track;
        a member positioned between the first platform and the second platform, the member being configured such that movement of the member relative to the first platform moves the second platform along an axis that is normal to the planar upper surface; and
        an actuator that is positioned on the first platform and is operable to laterally move the member bi-directionally to move the second platform along the axis that is normal to the planar upper surface;
    an indexing station that is positioned along the track and operable to engage the actuator as the cart passes by the indexing station along the track; and
    a controller configured to:
        move the cart along the track;
        operate the ejector head to eject a layer of material onto the planar upper surface of the second planar platform when the cart is positioned opposite the ejector head; and operate the indexing station to engage the actuator as the cart passes by the indexing station along the track to move the second platform of the cart along the axis that is normal to the planar upper surface.

10. The printing system of claim 9, the cart further comprising:
a plurality of first pivoting members, one end of each pivoting member in the plurality of first pivoting members being connected to the first platform and another end of each pivoting member of the plurality of first pivoting members being connected to the member, the plurality of first pivoting members being configured to pivot and transform lateral motion of the member into motion of the member along the axis that is normal to the planar upper surface; and
a plurality of second pivoting members, one end of each pivoting member in the plurality of second pivoting members being connected to the member and another end of each pivoting member in the plurality of second pivoting members being connected to the second platform, the plurality of second pivoting members being configured to pivot and transform lateral motion of the member and motion of the member along the axis that is normal to the parallel upper surface into motion of the second platform along the axis that is normal to the planar upper surface.

11. The printing system according to claim 10, wherein the end of each pivoting member in the plurality of second pivoting members connected to the member of the cart is adjacent to the other end of a respective pivoting member in the plurality of second pivoting members connected to the member.

12. The printing system of claim 9, the controller is further configured to:
operate the indexing station to move the second platform with reference to a change in height corresponding to a thickness of the layer of material ejected by the ejector head onto the planar upper surface of the second planar platform.

13. The printing system of claim 12, the controller being further configured to:
identify the change in height with reference to at least one of:
a predetermined layer thickness of for layers of material to be ejected by the ejector head;
a measured thickness of the layer of material ejected by the ejector head;
a measured height of the planar upper surface of the second platform; and
a shape of an object to be formed by the material ejected by the ejector head.

14. The printing system according to claim 9, the actuator of the cart further comprising:
a rod having an external thread; and
a bushing having an internal thread configured to receive the external thread of the rod, the bushing being rotationally fixed relative to the rod to enable rotation of the rod within the internal thread to move the bushing bi-directionally along the rod, wherein the bi-directional movement of the bushing laterally moves the member bi-directionally;
the actuator being configured to rotate the rod to move the second platform along the axis that is normal to the planar upper surface.

15. The printing system according to claim 14, the actuator further comprising:
a worm gear configured to rotate the rod as the worm gear rotates; and
a pulley member configured to engage with the worm gear and rotate the worm gear as the pulley member rotates;
the indexing station further comprising:
a drive belt that is configured to engage with the pulley member as the cart passes by the indexing station along the track so the pulley member is driven at a rate corresponding to a difference between a speed of the cart and a speed of the drive belt;
the indexing station being configured to drive the drive belt at different speeds to index the second platform along the axis that is normal to the planar upper surface by different amounts.

16. The printing system according to claim 9, the actuator further comprising:
a first pair of cooperating members configured to guide motion of the member along the axis that is normal to the planar upper surface as the member laterally moves, one of the first pair of cooperating members being fixed to the actuator, and the other of the first pair of cooperating members being fixed to the member.

17. The printing system according to claim 9 further comprising:
a second pair of cooperating members configured to restrain motion of the second platform along the axis that is normal to the planar upper surface, one of the second pair of cooperating members extending from the second platform towards the first platform and defines a recess, and the other of the second pair of cooperating members being fixed to the first platform and defining a protrusion that is received within the recess.

18. The printing system according to claim 17, the first platform defining an aperture configured to receive at least a portion of the one cooperating member extending from the second platform so motion of the second platform towards the first platform is not restrained by the one cooperating member.

19. The printing system according to claim 9 further comprising:
a plate that is removably mounted on the planar upper surface of the second platform, the plate being configured to receive material ejected from the ejector head of the printing system for forming a three-dimensional object.

* * * * *